United States Patent
Best

(10) Patent No.: US 6,595,231 B1
(45) Date of Patent: Jul. 22, 2003

(54) DEVICE AND METHOD FOR REGULATING THE PRESSURE OF A GAS STREAM

(75) Inventor: Ronald Best, Middelburg (NL)

(73) Assignee: Varian, BV, Middelburg (NL)

(*) Notice: Subject to any disclaimer, the term of this patent is extended or adjusted under 35 U.S.C. 154(b) by 0 days.

(21) Appl. No.: 09/868,056
(22) PCT Filed: Dec. 15, 1999
(86) PCT No.: PCT/NL99/00773
§ 371 (c)(1), (2), (4) Date: Aug. 20, 2001
(87) PCT Pub. No.: WO00/36482
PCT Pub. Date: Jun. 22, 2000

(30) Foreign Application Priority Data
Dec. 15, 1998 (NL) .......... 1010815

(51) Int. Cl.[7] .......... G05D 16/20; G05D 16/06
(52) U.S. Cl. .......... 137/14; 137/116.3; 137/487.5; 251/61.3
(58) Field of Search .......... 137/12, 14, 485, 137/487.5, 488, 505.14, 510, 116.3; 251/28, 61, 61.3

(56) References Cited

U.S. PATENT DOCUMENTS

| | | | |
|---|---|---|---|
| 2,701,578 A | | 12/1955 | Hamilton |
| 3,602,428 A | | 8/1971 | Worth et al. |
| 4,798,521 A | | 1/1989 | Schmidt et al. |
| 5,174,326 A | * | 12/1992 | Steinert et al. .......... 137/468 |
| 5,178,177 A | * | 1/1993 | Scott .......... 137/14 |
| 6,056,008 A | * | 5/2000 | Adams et al. .......... 137/487.5 |

FOREIGN PATENT DOCUMENTS

| | | |
|---|---|---|
| DE | 601933 | 8/1934 |
| DE | 623996 | 12/1935 |
| FR | 995447 | 12/1951 |
| FR | 1431371 | 1/1966 |

OTHER PUBLICATIONS

Search report from EPO for the corresponding international application PCT/ NL99/00773.*
International Preliminary examination reports from EPO for the corresponding international application PCT/ NL99/00773.*
"Compagnie continentale des compteurs," La Pratique de Industries Mecaniques, vol. 46, No. 6, Jun. 1960, pp. 148–149, XP002134561.

* cited by examiner

Primary Examiner—Michael Powell Buiz
Assistant Examiner—Ramesh Krishnamurthy

(57) ABSTRACT

Disclosed is a device for regulating the pressure and/or flow of a gas stream, which device comprises a housing (9, 109) which is provided with a pressure-regulating chamber (4, 104), at least part of whose wall comprises a diaphragm (10, 110), which diaphragm (10, 110) is subjected, on the side remote from the pressure-regulating chamber (4, 104), to an adjustable prestressing force, the pressure-regulating chamber comprising an inlet opening (3, 28, 128) for a gas and an outlet opening (5, 29, 129) for a gas, it being possible for at least one of the openings (3/5, 28/29, 128/129) to be completely or partially closed off with the aid of a displaceable closure member (15, 115) which is connected to the diaphragm (10, 110) in such a manner that the position of the closure member is dependent on the displacement of the diaphragm.

31 Claims, 4 Drawing Sheets

DEVICE AND METHOD FOR REGULATING THE PRESSURE OF A GAS STREAM

STATEMENT REGARDING FEDERALLY SPONSORED RESEARCH OR DEVELOPMENT (Not applicable.)

BACKGROUND OF THE INVENTION

The present invention relates to a device for regulating the pressure and/or the flow of a gas stream, which device comprises a housing which is provided with a pressure-regulating chamber, at least part of whose wall comprises a diaphragm, which diaphragm is subjected, on the side remote from the pressure-regulating chamber, to an adjustable prestressing force, the pressure-regulating chamber comprising an inlet opening for a gas and an outlet opening for a gas, it being possible for at least one of the openings to be completely or partially closed off with the aid of the diaphragm. This means that the extent to which the diaphragm bends is dependent, on the one hand, on the instantaneous pressure in the pressure-regulating chamber and, on the other hand, on the stress which is applied to the diaphragm with the aid of the prestressing means, wherein the diaphragm is actively connected to a pressure chamber for a gas, which pressure chamber is provided with has an inlet opening for a gas and an outlet opening for a gas for setting the pressure in the pressure chamber for the purpose of applying the prestressing force.

A device of the abovementioned type is known in the prior art. The device may be used, for example, to regulate a gas stream which is at a relatively high pressure down to a gas stream at a lower pressure. The position of the closure member is linked to the bending of the diaphragm. Consequently, the pressure of the gas stream which leaves the pressure-regulating chamber via the outlet opening will be determined by the position of the diaphragm in a starting position. The known device can be used to reduce the pressure of a gas stream to a desired level. The pressure of the gas stream which will leave the pressure-regulating chamber at the outlet opening will be dependent on the size of the inlet opening which is left open by the closure member. The more the closure member closes off the inlet opening, the lower the pressure flowing out of the outlet opening of the pressure-regulating chamber will be.

The above mentioned device is (i.a.) known from U.S. Pat. No. 4,798,521. From this document a device is known for regulating the pressure in a container. In addition to the mentioned elements, the known device comprises means for measuring possible differences in the pressure in the pressure chamber and the device's outlet opening, which differences can used for regulating the pressure in the pressure chamber.

BRIEF SUMMARY OF THE INVENTION

An important drawback associated with devices known from the prior art is that it still is impossible to accurately set the position of the diaphragm. In practice the switching time of the valves inside the inlet opening and the outlet opening will not be infinitesimal. There will always be a physical limitation which limits the accuracy of the control.

The object of the present invention is to provide a device of the type mentioned in the introduction with which it is possible to accurately set the position of the diaphragm. It is also desirable for it to be possible to adjust a position of the diaphragm once it has been set, in a relatively simple manner.

These objects are achieved, in the present invention, in that the inlet opening is provided with a flow restriction. Therewith it is possible that outlet opening is provided with a flow restriction.

The use of a pressure chamber in which a gas is kept under pressure allows the position of the diaphragm in the starting position, and therefore the position of the closure member in the inlet opening of the pressure-regulating chamber, to be adjusted with the aid of a gas pressure. By increasing or reducing the pressure in the pressure chamber, the position of the diaphragm can be fixed as desired.

Because of the presence of the restrictions at both the inlet opening and the outlet opening it is possible to control the flow to and from the pressure chamber with a much higher accuracy then before.

According to the invention it is further possible that the side of the diaphragm which is remote from the pressure-regulating chamber adjoins the pressure chamber. Therewith it is possible that the inlet opening and the outlet opening of the pressure chamber are provided with a remotely controllable shut-off valve.

Therewith the position of the diaphragm can be altered by altering the pressure in the pressure-regulating chamber.

These measures ensure, in a very simple manner, that the pressure in the pressure chamber can be increased or reduced. The remotely controllable shut-off valves allow the setting of the pressure in the pressure-regulating chamber to be coupled, for example, to measuring means which are accommodated elsewhere in the device.

According to the present invention, it is possible for the device to be provided with means for measuring the pressure of the gas stream, which measuring means are arranged in the vicinity of the outlet opening of the pressure-regulating chamber. It is also possible for the device to be provided with means for measuring the pressure of the gas stream, which measuring means are arranged in the vicinity of the inlet opening of the pressure-regulating chamber. In this case, it is advantageous for the device to be provided with regulating means which are actively connected to, on the one hand, the means for measuring the gas pressure and, on the other hand, the remotely controllable shut-off valves of the pressure chamber.

These measures ensure that the pressure or the flow of the gas stream which leaves/flows into the pressure-regulating chamber can be monitored. By additionally coupling this pressure measurement to the remotely controllable shut-off valves, it is possible for any deviations in the measured pressure of the gas stream to be directly translated into a change in the position of the diaphragm.

According to the invention, it is also possible for the diaphragm to be connected, via a coupling member, to a second diaphragm, the said second diaphragm adjoining the pressure chamber, and that side of the diaphragm which is remote from the pressure-regulating chamber adjoining a second pressure chamber, the pressure-regulating chamber being in communication, via a restriction, with a feed line for a gas, and the second pressure-regulating chamber being in open communication with the said feed line.

This measure allows the present invention to be used for setting a diaphragm, with both its sides adjoining a feed line for a gas stream. The first side of the diaphragm adjoins a closed space which contains an outlet opening and is connected to the feed line via a restriction. The other side of the diaphragm adjoins a closed space which is in free communication with the feed line. If flow takes place from the feed line, via the restriction, to the outlet opening of the closed space on the first side of the diaphragm, the presence of the restriction will cause there to be a pressure difference across the diaphragm. This pressure difference determines the position of the diaphragm and hence the extent to which the outlet opening is closed off. The equilibrium position about which the diaphragm will move can be set, by means of the measures described above, with the aid of the said pressure chamber, it being possible to vary the pressure in the pressure chamber. At least one wall of the pressure chamber is formed by a second diaphragm which is connected, via a coupling member, to the diaphragm which is connected on both sides to the feed line.

The present invention also relates to a gas chromatograph provided with the above mentioned device.

The device according to the present invention is especially suited to be used in a gas chromatograph. Firstly because at both sides of the diaphragm a gas is present, diffusion through the material of the diaphragm will be limited to a minimum. Further it is possible to connect both the inlet opening of the pressure-regulating chamber and the inlet opening of the pressure chamber to one and the same feed line. That means that on both sides of the diaphragm the same gas will be present. In the gas chromatograph it is possible to add a substance to be examined to the gas flow when the pressure of the gas flow has been decreased from a relatively high pressure to a relatively low pressure, i.e. downstream of the device according to the present invention. The result of this will be that possible loss of material to be examined will be prevented.

In a second aspect, the present invention relates to a method for regulating the pressure or a flow of a gas stream, in which the gas stream to be regulated is fed from an inlet chamber, via an inlet opening, to a pressure-regulating chamber, at least part of whose wall is formed by a diaphragm, the pressure in the pressure-regulating chamber being regulated by adjusting the size of the inlet opening of the pressure-regulating chamber with the aid of a closure member which is actively connected to the diaphragm in such a manner that a change in the level of displacement of the diaphragm causes a change to the extent to which the closure member closes off the inlet opening, the diaphragm being subjected to a prestressing force, with the aid of which a specific positioning is imposed on the diaphragm.

The method according to this invention is characterized in that the said prestressing force is applied by a pressurized gas in the pressure chamber, the starting position of the diaphragm being set by setting the pressure of the gas in the pressure chamber.

According to the present invention, it is possible for the gas stream to be discharged from an outlet opening of the pressure-regulating chamber. In this case, it is advantageous for the pressure of the gas stream to be measured at least periodically in the vicinity of the outlet opening of the pressure-regulating chamber, and for the measured value to be compared with a desired value which is dependent on the starting position of the diaphragm, and for the pressure in the pressure chamber to be increased or reduced on the basis of this comparison by feeding or discharging gas to or from the pressure chamber.

This measure makes it possible to keep the pressure in the gas stream which leaves the pressure-regulating chamber as close as possible to the desired value. In principle, the device is designed in such a way that any deviations from the desired pressure in the gas stream emerging from the pressure-regulating chamber caused by variations in the position of the diaphragm can be eliminated by the device itself. Any undesirable residual variations can be effectively eliminated by means of the method according to the invention.

Furthermore, it is possible, according to the invention, for a volume of gas to be fed to the pressure chamber, during or after which process a different volume of gas is discharged from the pressure chamber.

The effect of this measure is that during use of the device according to the invention there is no problem with so-called dead spaces. If an insufficient volume of gas were to be fed to the pressure chamber, the diaphragm might react in a non-linear manner to this addition of gas. By ensuring that the volume of gas which is supplied is always greater than a specific threshold, and that a certain volume of gas is discharged during or immediately after this volume of gas has been supplied, it is ensured that, on balance, small volumes of gas can be fed to the pressure chamber, in other words that the pressure in the pressure chamber can be adjusted very accurately without there being problems with dead spaces.

According to the invention, it is advantageous if the pressure in the pressure chamber is allowed to gradually increase or decrease.

For certain applications, it may be advantageous to allow the pressure of the gas stream which leaves the pressure-regulating chamber to gradually increase or decrease. For example, in the case of a gas chromatograph, it may be that in the event of variations in pressure, different elements are separated out of the gas stream in a column which may be positioned in a line which is connected to the device according to the present invention. If the pressure in the pressure chamber is now gradually varied, the pressure of the gas stream leaving the pressure-regulating chamber will also vary. These variations may benefit the separating capacity of the column.

DETAILED DESCRIPTION OF THE INVENTION

Figure 1:
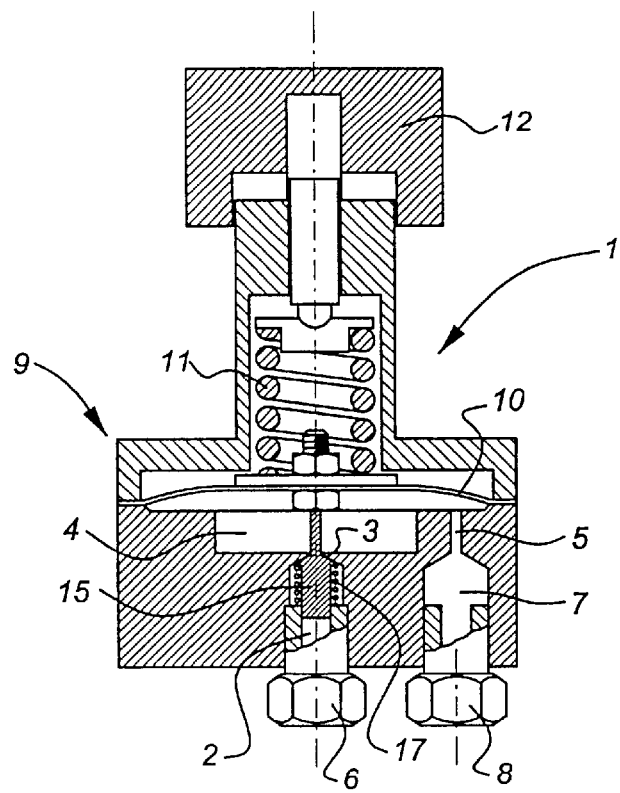
FIG. 1 shows a device for regulating the pressure or the flow of the gas stream according to the prior art.

FIG. 1 shows a device 1 by means of which it is possible to regulate the pressure of a gas stream. The device in accordance with FIG. 1 is known in the prior art.

The device in accordance with FIG. 1 comprises a gas inlet chamber 2 which is connected, via an inlet opening 3, to a pressure-regulating chamber 4. In addition to the inlet opening 3, this pressure-regulating chamber also comprises an outlet opening 5. The inlet chamber 2 forms a passage which is provided with means 6 for connecting a gas line, for example. The means 6 may, for example, comprise a nut. The outlet opening 5 of the pressure-regulating chamber 4 is connected to a passage 7 which is provided with means 8 for connection of a gas line, for example.

On the top side, in the position shown in the figure, the pressure-regulating chamber 4 is closed off by means of a flexible member or diaphragm 10. On its top side, the diaphragm 10 is connected to a spring 11. The spring 11 can be used to apply a stressing force to the diaphragm 10. The extent of the stressing force exerted by the spring 11 on the diaphragm 10 is dependent on the setting of the setscrew 12 which is actively connected to the top side (in the position shown in the figure) of the spring 11.

On the underside, the diaphragm 10 is connected to a closure member 15. The closure member 15 is coupled to the diaphragm 10 in such a manner that the position of the closure member 15 is dependent on the bending of the diaphragm 10.

It can be seen in FIG. 1 that the closure member 15 is connected, on the underside, to a spring 17. This spring 17 ensures that the closure member 15 is positioned correctly in the outlet opening 3 of the pressure-regulating chamber by the interaction of the diaphragm 10 and the spring 17.

The device 1 according to the prior art operates as follows:

The setscrew 12 and the spring 11 are used to set a specific spring pressure on the diaphragm 10. The spring pressure acting on the diaphragm 10 sets the position of the closure member 15 in the feed opening 3. Then, the inlet chamber 2 is connected to a relatively high-pressure line. Via the passage 7, the discharge opening 5 can be connected to a line in which it is desired to have a gas stream at a constant pressure. The gas stream from the inlet chamber 2 to the pressure-regulating chamber 4 will exert a pressure on the underside of the diaphragm 10. The pressure which is built up in the pressure-regulating chamber 4, on the one hand, and the pressure which is exerted by the spring 11, on the other hand, together determine the position of the diaphragm 10. In this case, the higher the pressure in the pressure-regulating chamber 10 becomes, the greater the distance between the diaphragm 10 and the inlet opening 3 of the pressure-regulating chamber 4 will be. As a result, the closure member 15 will be pulled upwards, so that the inlet opening 3 will be closed off further. Since the passage is closed off further, the gas stream from the inlet chamber 2 to the pressure-regulating chamber 4 will decrease. As a result, the pressure in the pressure-regulating chamber 4 will fall, with the result that the diaphragm 10 will move slightly downwards. As a result, the opening formed in the feed opening 3 will increase in size again, so that the pressure in the pressure-regulating chamber 4 can increase again. It will be clear that coupling the diaphragm 10 to the closure member 15 will result in an automatically established equilibrium in the pressure-regulating chamber 4. The level of this equilibrium pressure in the pressure-regulating chamber 4, and hence the level of flow from the chamber 4, can be set with the aid of the setscrew and the spring 11. The equilibrium pressure which will prevail in the pressure-regulating chamber 4 will ensure a flow of gas through the outlet opening 5 and the adjoining passage 7 which is at an essentially constant pressure.

The device 1 for regulating the pressure of a gas stream according to the prior art can be used in a gas chromatograph. For a chromatograph of this nature to operate correctly, it is important that it is possible for the gas stream which is to be analyzed to be forced through a column, for example, at a pressure which is easy to set and constant. The device 1 according to the prior art is therefore installed in the feed line of a column of this nature.

A significant drawback of the device 1 according to the prior art is that it is necessary for a pressure to be continuously exerted on the diaphragm 10 with the aid of the spring 11. Moreover, the diaphragm 10 cannot be accurately set with the aid of the spring 11 and the setscrew 12. A further drawback is that the diaphragm 10 may cause diffusion to occur. Pressurized gas will be present in the pressure-regulating chamber 4. Depending on the material of the diaphragm 10, it is possible that certain components of the gas in the pressure-regulating chamber 4 may diffuse through the diaphragm 10. This means that these constituents will disappear from the gas stream and will not leave the pressure-regulating chamber via the outlet opening 5. If the device 1 according to the prior art is used, for example, for a gas chromatograph, the occurrence of diffusion may mean that the measurements taken will be unreliable.

Figure 2:
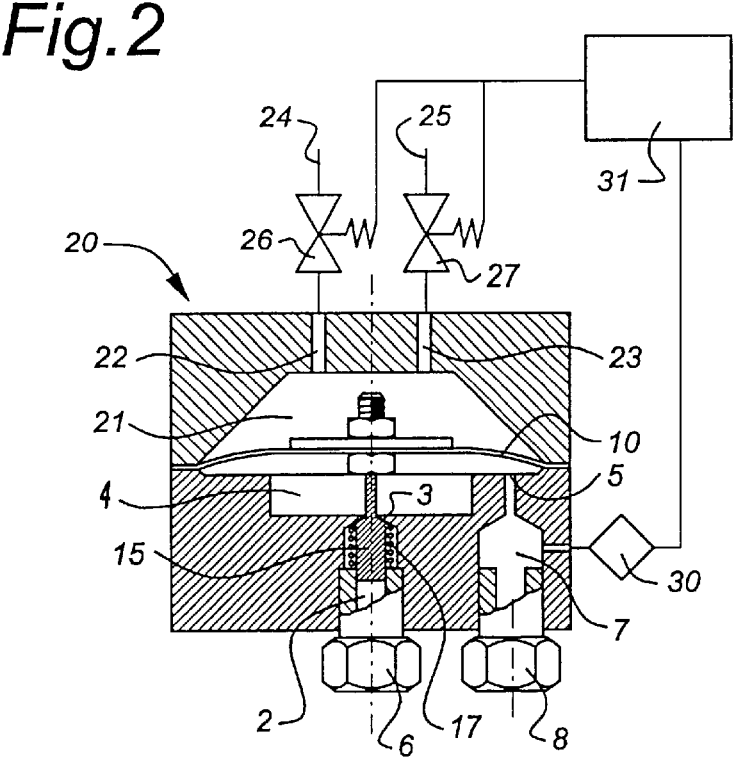
FIG. 2 shows a device for regulating the pressure in a gas stream according to a preferred design.

FIG. 2 shows an exemplary embodiment of the device 20 for regulating the pressure of a gas stream according to the present invention. The device 20 comprises a housing 9 in which an inlet chamber 2 is incorporated. Via an inlet opening 3, this inlet chamber 2 is connected to the pressure-regulating chamber 4. On its top side (in the position shown in the figure), the pressure-regulating chamber 4 is closed off by means of a flexible member 10. The pressure-regulating chamber 4 is connected to a passage 7 via an outlet opening 5. The inlet chamber 2 can be connected to a connection line for a gas, for example, with the aid of connection means 6. With the aid of connection means 8, passage 7 can be connected to, for example, a discharge line for gas. On the top side of the diaphragm 10, the device according to the present invention comprises a pressure chamber 21. This pressure chamber 21 comprises an inlet opening 22 and an outlet opening 23. The inlet opening 22 and the outlet opening 23 can be connected to a feed line 24 for gas and a discharge line 25 for a gas, respectively. Remotely controllable closure members 26 and 27 may be arranged in the lines 24 and 25, respectively. In the device 20, measuring means 30, which can be used to measure the pressure of the gas in the vicinity of the outlet opening 5, are arranged in the vicinity of the outlet opening 5. These pressure-measuring means 30 are actively connected to a control unit 31. This control unit may, for example, contain features which compare the values measured by the means 30 with desired or set values. The control unit 31 is in turn actively connected to the remotely controllable shut-off valves 26 and 27.

The device 20 according to the present invention functions as follows:

With the aid of the attachment means 6, a gas line containing a gas which is at a relatively high pressure can be connected to the inlet chamber 2. Using each of the attachment means 6. 8, a discharge line for discharging a gas can be attached to the passage 7. In this line, it is possible to generate a gas stream which is at a relatively constant pressure. The gas flows towards the pressure-regulating chamber 4 via the inlet chamber 2 and the inlet opening 3. The gas stream then leaves the pressure-regulating chamber 4 via the outlet opening 5 in the passage 7. Just as in the device according to the prior art, the inlet opening 3 can be closed off with the aid of a closure member 15 which is actively connected to the diaphragm 10. In this case, the higher the pressure in the pressure-regulating chamber 4 becomes, and the more the diaphragm 10 is displaced, the smaller the free flow passage for the gas from the inlet chamber 2 towards the pressure-regulating chamber 4, via the inlet opening 3, will become. Just as in the prior art, an equilibrium pressure, and therefore an equilibrium flow, will be automatically built up in the pressure-regulating chamber 4. This means that a gas stream which is at an essentially constant pressure will leave the pressure-regulating chamber 4 via the outlet opening 5. In the device 20 according to the invention, the equilibrium level of the pressure which is set in the pressure-regulating chamber 4 is not dependent on a spring pressure, but rather on a pressure which is built up in a pressure chamber 21 on the opposite side of the diaphragm 10. This means that the pressure of the diaphragm 10 is essentially determined, on the one hand, by the pressure in the pressure-regulating chamber 4 and, on the other hand, by the pressure in the pressure chamber 21. Like the pressure-regulating chamber 4, the pressure chamber 21 is provided with an inlet opening 22 and an outlet opening 23. As has been stated, the inlet opening 22 may also be connected to a gas line 24. A closure member 26 may be arranged in this gas line 24. A similar arrangement applies to the outlet opening 23, to which a gas line 25 can be coupled. A closure member 27 can be arranged in this gas line 25.

When it is desired to set the pressure in the pressure chamber 21, the shut-off valves 26 and 27 can be opened and closed as desired and gas can be fed to or discharged from the pressure chamber 21 with the aid of the lines 24 and 25.

In use, the pressure of the gas which prevails in the discharge passage 7 will be periodically or continuously measured with the aid of the measuring means 30. This measurement information will be transmitted to the control unit 31. The control unit 31 is actively connected to the shut-off valves 26 and 27 in the lines 24 and 25. If, for example, it is established by the measuring means 30 that the pressure of the gas which is flowing out of the pressure-regulating chamber 4 is too high, the pressure in the pressure chamber 21 can be reduced by opening the shut-off valve 27 in the line 25 for a certain time. As a result, gas will be able to escape from the pressure chamber 21, with the result that a new equilibrium pressure can be established in the pressure-regulating chamber 4.

It should be noted that the discharge line 25 is generally able to flow out freely to the environment.

The advantage of the device 20 according to the present invention is that the position of the diaphragm 10 can be adjusted with a relatively high degree of accuracy. If desired, the gas feed via the inlet opening 22 of the pressure chamber 21 can be used to feed gas until the correct pressure is reached in the pressure-regulating chamber 4. In this case, the periodic measurement of the pressure in the discharge passage 7 can be used as an input signal for adjusting the pressure in the pressure chamber 21.

An additional advantage is that the pressure in the pressure chamber 21 can be changed, for example periodically or gradually. Applications are known, for example in the case of gas chromatographs, in which it is advantageous if the pressure of the gas stream which is fed to a chromatograph increases or decreases, for example. In the event of a varying pressure, it will be possible to separate different components by means of the detection means which are generally coupled to the column which is used in a chromatograph (not shown). By periodically varying this pressure of the gas which is fed to the chromatograph, it is possible to carry out numerous refined measurements.

Figure 3:
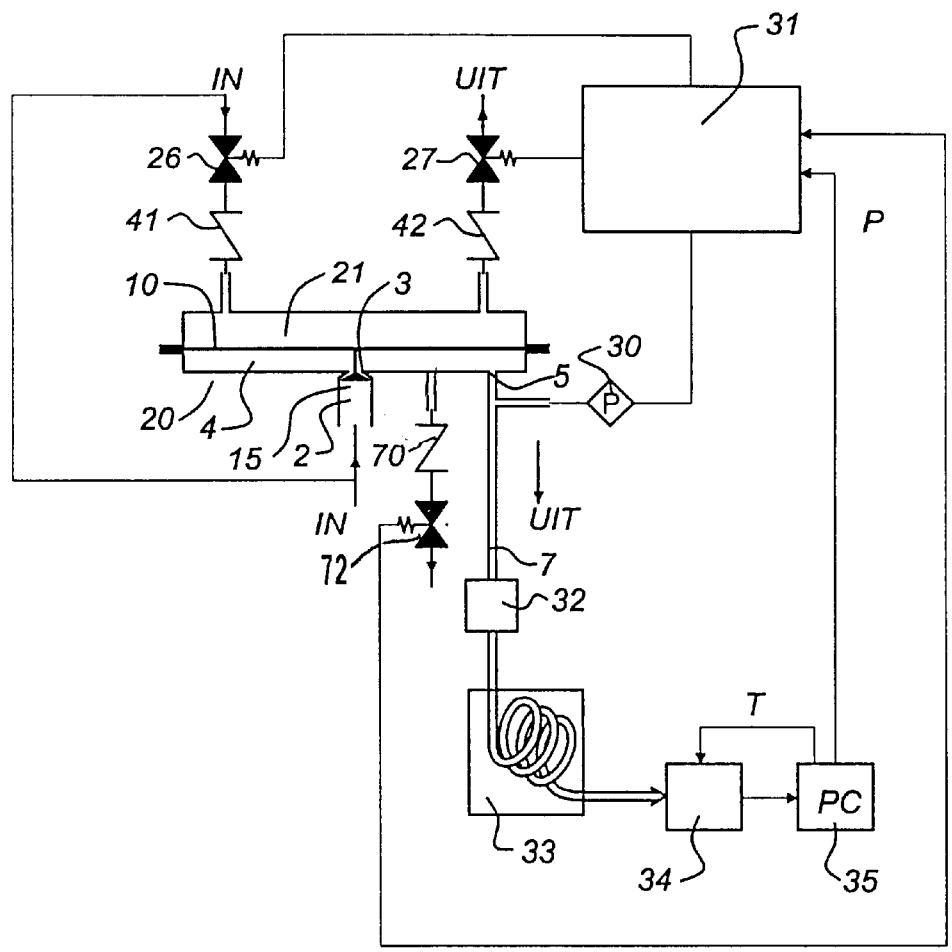
FIG. 3 shows a diagrammatic overview of a gas chromatograph in which the device according to the present invention is arranged.

FIG. 3 diagrammatically depicts the use of a device 20 according to the invention which is employed in a gas chromatograph. From a source (not shown), a gas stream is fed towards the inlet chamber 2. As explained in FIG. 2, the inlet chamber 2 can be closed off from the pressure-regulating chamber 4 with the aid of the closure member 15. The pressure which is built up in the pressure-regulating chamber 4 on the underside of the diaphragm 10 and the pressure which is built up in the pressure chamber 21 on the top side of the diaphragm 10 together determine the position of the diaphragm 10, and hence the position of the closure member 15 in the inlet opening 3 between the inlet chamber 2 and the pressure-regulating chamber 4. Via the outlet opening 5, a gas stream which is at an essentially constant pressure will flow through the passage 7. Since a constant pressure is ensured, the volume of the flow will also be constant. This stream which is at an essentially constant pressure is fed from the passage 7 towards an injector 32. With the aid of this injector, the gas stream is fed, for example, to a column chroinatograph which is diagrammatically indicated by 33. This column chromatograph may, for example, comprise a coiled glass tube in which a separating medium is arranged. The gas stream emerging from the column is then fed to detection means which are diagrammatically indicated by 34. The detection means may be coupled to a processing unit, such as a PC35. This PC may also serve, for example, to control the temperature regulation of the chromatograph. This is diagrammatically indicated by the line T. The PC35 can also be used to control the control unit 31 which is used to regulate the pressure in the pressure chamber 21. The pressure in the pressure-regulating chamber 20 is regulated as described with reference to FIG. 2.

FIG. 3 further shows that the pressure regulating chamber 4 is provided with a valve for relieving the pressure, pressure relief valve 72. The path at the output of pressure-regulating chamber 4 sometimes exhibits a high flow restriction, attrubutable to the presence of a long column having a small internal diameter. Because of this high (flow) restriction the speed for regulating from a relatively high pressure to a relatively low pressure is limited. Pressure relief valve 72 enables a part of the redundant gas flow, to be released through flow restriction 70.

Pressure relief valve 72 also serves as a pressure safety valve. When because of malfunctioning or leakage the pressure in the pressure regulating chamber 4 is too high, the control unit 31 will react, by opening pressure relief valve 72. Therefore, possible damage to the system can be prevented.

Moreover, FIG. 3 shows, that the inlet which is connected to the inlet chamber 2 is the same as the inlet connected to the valve 26. That mean that the gas that is being used for regulating the pressures in both the chamber 4 and 21 comes from the same source. When used as a gas chromatograph normally a stable gas flow is established, before adding the medium to be examined to the gasflow, upstream of the column.

Moreover in FIG. 3 it shows that between the respective valve 26 and 27 and the pressure chamber 21 flowrestrictions 41, 42 are present. These valves have at least a certain minimal switching time, therefore it is possible that when the valves are opened an amount of gas is being transported through the valve that, in respect of the volume of the pressure chamber, is too large in order to obtain the preferred control characteristics. By adding the restrictions at both the inlet and outlet opening of the pressure chamber 21 an accurate control can be established.

Alternatively a so called "padding" (not shown) can be used. This padding can be positioned inside the opening of the valve connected to the inlet opening or oulet opening of the pressure chamber. Because of the presence of the padding the volume between the valve sealing and the restriction can be partially filled. Therefore, even a smaller amount of gas having a relatively high pressure will be transported through the valve, thereby increasing the accuracy of the pressure control.

If it is desired to adjust the pressure in the pressure-regulating chamber 4, and therefore the pressure of the gas stream which will be guided out of the passage 7 of the device 20, gas has to be discharged from or fed to the pressure chamber 21 with the aid of the shut-off valves 26 and 27. If it is desired to accurately adjust the pressure in the pressure chamber 21, it is preferable to use small volumes of gas which are fed to or discharged from the pressure chamber 21. Owing to the volume of the pressure chamber 21 itself, there will inevitably be a certain volume of dead space. This means that feeding or discharging a small volume of gas from the pressure chamber 21 will not have any effect on the position of the diaphragm 10, and hence on the ultimate pressure in the pressure-regulating chamber 4. The regulating arrangement illustrated in FIG. 4 5 can be used to avoid this "dead space" being formed. If the pressure in the pressure chamber 21 is to be increased, a relatively large volume of gas is fed into the pressure chamber via the shut-off valve 26. This is indicated by the line IN. At the same time, a slightly smaller volume of gas is released from the pressure chamber 21 via the shut-off valve 27. This is indicated by the line OUT. The net result is that a relatively small volume of gas will be fed to the pressure chamber 21. This is indicated by the line IN (RESULT).

In practice, it is, for example, possible, when setting the pressure in the pressure chamber 21, firstly to opt for supplying gas in a few large steps via the shut-off valve 26. When the vicinity of the desired setpoint is reached, the setting of the pressure can be refined using the method illustrated in FIG. 5.

It can be seen from FIG. 3 that a restriction 41 is arranged between the shut-off valve 26 and the inlet opening of the pressure chamber 21. A similar restriction 42 is also arranged between the outlet opening of the pressure chamber 21 and the shut-off valve 27. These restrictions 41 and 42 are to be regarded as "delay means" for the gas stream. In order to be able to correctly and accurately regulate the gas stream fed into the pressure chamber 21 and the gas stream discharged from the pressure chamber 21, it is advantageous to position a filter-like retention member in the line from the shut-off valve 26 and in the line to the shut-off valve 27. This retention member may be likened to a resistor in an electrical line. The restrictions 41 and 42 may, for example, be formed by sintered material. The gas stream is allowed through but delayed by a porous, spongy structure of the sintered material.

Figure 4:
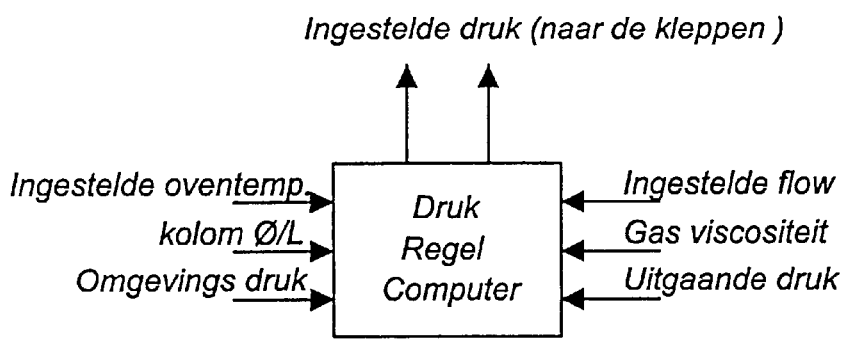
FIG. 4 shows a diagrammatic overview of possible input and output parameters of a pressure control computer useful in the gas chromatograph illustrated in FIG. 3.
Figure 5:
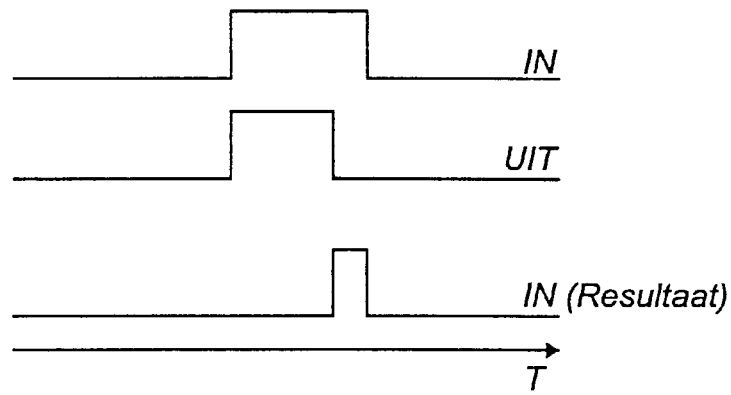
FIG. 5 diagrammatically shows the feed of a gas stream to the pressure chamber.

FIG. 4 depicts which parameters will be fed to the "pressure control computer", PC 35, shown in FIG. 3. The incoming signals e.g. can be used for the flow set, the gas viscosity, the pressure out, the ambient pressure, the diameter and length of the column connected to the pressure-regulating chamber 4 and/or the set oven temperature. All these parameters can be forwarded to the "pressure control computer", PC 35, which sends signals to the control valves subsequently to establish the required pressure (Pset).

The device 20 according to the present invention is suitable in particular for very small applications. The design of the device 20 means that it can be miniaturized relatively easily. One exemplary embodiment is a device 20 made of silicon, for example, using etching techniques.

Figure 6:
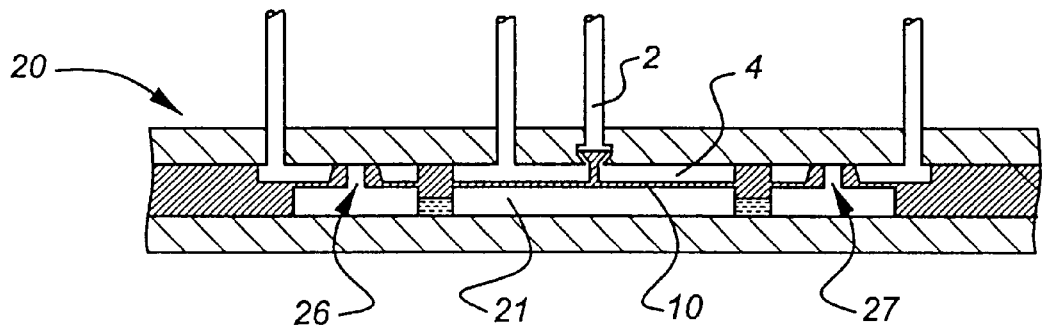
FIG. 6 shows a possible embodiment of the device according to the present invention, in a miniaturized form.

In FIG. 6, the inlet chamber 2 is situated on the top side of the diaphragm 10. The lines illustrated in the figure will in practice have a thickness of a few $\mu$m. The pressure chamber 21 is situated on the underside of the diaphragm 10 in the device 20. The shut-off valves 26 and 27 are respectively formed by flexible closure lips which are shown on the left and right in the figure.

Figure 7:
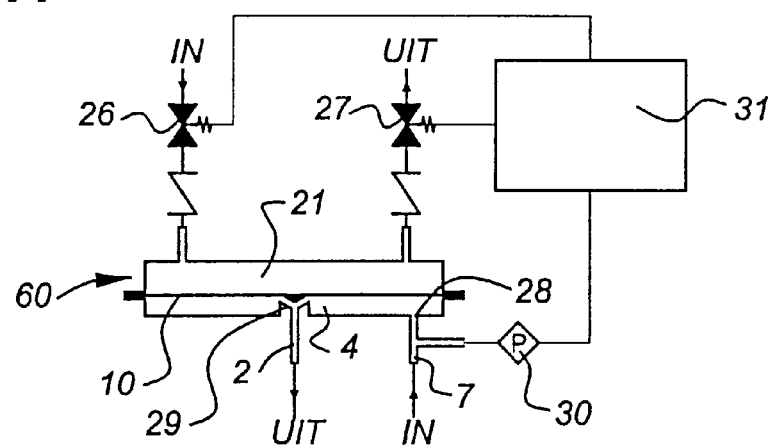
FIG. 7 diagrammatically shows the present invention in the form of a "backpressure" regulator.

The present invention refers to the use of the device 20 according to the present invention for forming a stream of gas which is at an essentially constant pressure from a feed gas stream which is at a relatively high pressure. The structure which has already been discussed with reference to the figures mentioned above may, however, also be employed, with a minor adaptation, as back pressure regulator. This means that in this case the inlet is formed by the passage 7 which will serve as the feed passage. From the passage 7, the gas stream flows into the pressure-regulating chamber 4. In this case too, the position of the diaphragm 10 is determined by the pressure which prevails in both the pressure-regulating chamber 4 and the pressure chamber 21. The description of the figures mentioned above refers to the opening between the passage 2 and the pressure-regulating chamber 4 decreasing in size as the pressure in the pressure-regulating chamber 4 increases. It can be seen from FIG. 6 7 that in the device 60, which is intended to regulate a back pressure regulator, the outlet opening 29 between the pressure-regulating chamber 4 and the passage 2 increases in size as the pressure in the pressure-regulating chamber 4 increases. In practice, this will mean that when a gas stream is supplied via the passage 7 and the outlet opening 28, this gas stream can be fed to the pressure-regulating chamber 4 at an essentially constant pressure and with an essentially constant flow. Like the device 20 discussed above, the device 60 is equipped with measuring means 30, which can be used to measure the pressure of the gas stream in the passage 7. These measuring means 30 are actively connected to the control means 31, with the aid of which the shut-off valves 26, 27 can be operated.

Figure 8:
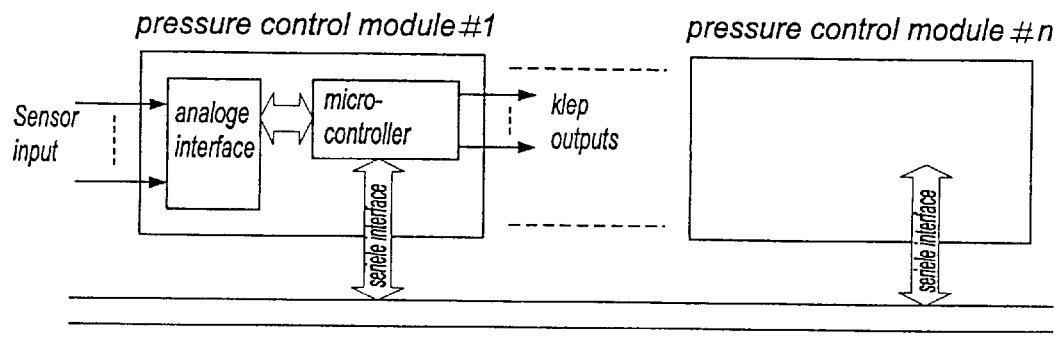
FIG. 8 is a schematic view of the operation of a pressure control module useful in the gas chromatograph illustrated in FIG. 3.

In FIG. 8 schematically the outlook over the pressure control computer is shown, which can be used in the device and the method according to the present invention. The pressure control computer is provided with electronics, such as a single chip micro controller and a high resolution A/D converter. The micro controller can by means of a serial interface communicate with any other instrument. By means of interface, parameters for pressure control can be set and the actual value of the pressure can be established. Every pressure control computer can monitor several pressure controls, completely independently. Moreover every pressure control computer has a known address, therefore several modules can be monitored in parallel by means of the same ire interface.

During calibration of the device, the values for calibration of the pressure sensors can be forwarded to the pressure control computer and automatically the off-set-values are determined. This calibration can be executed with reference to any reference-pressure. In the software these values can be used to correct the off-set automatically and to calculate the right pressure values.

The software present in the pressure control computer comprises a control algorithm, based on the use of fuzzy logic. As inputs for the fuzzy pressure controller (FPC) both the absolute variation of the actual pressure with respect to the said point and the speed of the pressure change can be used. Also other inputs such as the ambient temperature and the ambient pressure can be used as an input. The output of the fuzzy pressure controller determines how the valve should be controlled.

Figure 9:
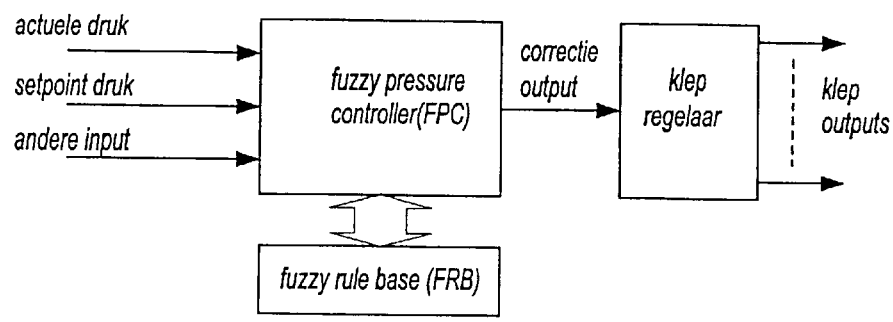
FIG. 9 is a schematic view of the operation of a fuzzy pressure controller useful in the gas chromatograph illustrated in FIG. 3.

The advantage of the fuzzy pressure controller is that it is not necessary to make a mathematical model of the behaviour of the device and the influence of the valves in the entire pressure-range. Building such a mathematical model in practice is very awkward, because the model strongly depends of on the ambient conditions, the actual work pressure ends the variable restrictions in the system. The fuzzy pressure controller is based on the fact that both the measured values and the set values will be divided by intervals, which overflow. By means of a fuzzy rule base the measured values will be examined and the right value for correction will be generated, wherein the fuzzy pressure controller will be working in a fully adaptive mode. That means that the ambient conditions, the non lineair behaviour of the device and the valves will be automatically compensated in the fuzzy process controller, therefore establishing a simple way for obtaining the required performance within the total pressure-range. This is schematically shown in FIG. 9. In the center of FIG. 9, the fuzzy pressure controller is shown, being connected to a fuzzy rule base. As input signals of the fuzzy pressure controller are used the actual pressure and the pressure setpoints. Moreover an other input is also possible. As output of the fuzzy pressure controller a correction-output is sent to a valve controller. From this value, signals are forwarded for correctly controlling the valves.

In practice it appears that the switching time of the valves is not in infinitesimal. It will always be a physical limitation, whereby the accuracy of the control will be limited. This can be minimized by controlling the valves in combination as has been described with reference to FIG. 5.

The fuzzy process controller uses besides the input and output valve also a so-called vent valve or pressure relief valve. This vent valve is an extra outlet opening and can be used to quickly decrease the pressure. The vent valve is controlled by the fuzzy pressure controller, when the difference in the set values, the set point and the actual pressure exceeds a certain value. Moreover the fuzzy process controller comprises an internal safety, which prevents that the pressure can exceed a certain critical value. As soon as an actual pressure is detected above the maximum acceptable pressure, the outlet opening and the vent valve are opened for quickly decreasing the pressure. This is necessary for protecting the downstream system.

The pressure control module can work stand alone and take care of a programmed and constant flow regulation. The several parameters for the pressure regulation, can be read from a known memory or can be introduced by means of a serial interface. The required pressure profile can automatically or by means of an external interface be started. This means that in combination with the pressure regulating device as described above a "stand-alone" unit can be created, forming a universally usable pressure-flow regulator.

Figure 10:
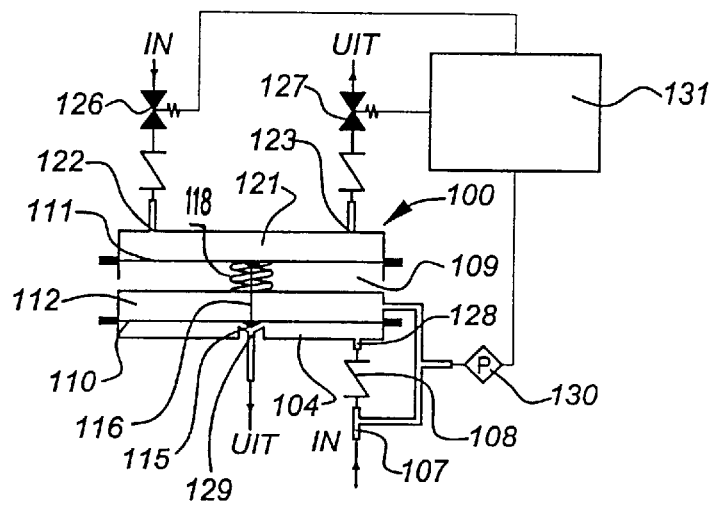
FIG. 10 shows a possible variant design of the device according to the present invention.

FIG. 10 shows a device 100 which can be used to regulate the flow of a gas stream.

Two diaphragms 110. 111 are arranged in the device 100 in accordance with FIG. 10. The first diaphragm 110 is positioned between a second pressure chamber 112 and a pressure-regulating chamber or flow chamber 104. The flow chamber 104 and the second pressure chamber 112 are both connected to a feed line 107 for a gas stream. The second pressure chamber 112 is in open communication with this feed line 107. Via a restriction 108, the flow opening of the flow chamber 104 is connected to the feed line 107. The flow chamber 104 has an outlet opening 109, which can be closed off with the aid of a member 115, and an inlet opening 128. When gas flows out of the outlet opening 109, a higher pressure will prevail in the second pressure chamber 112 than in the flow chamber 104. The reason for this is that the gas stream is delayed in the restriction 108. The pressures which prevail in the second pressure chamber 112 and the flow chamber 104, respectively, together determine the position of the membrane 110, and hence the position of the closure member 115 with respect to the outlet opening 102. In the same way as that discussed above with reference to FIGS. I to 6, the position of the member 115 will fluctuate around an equilibrium position.

The equilibrium position of the member 115, which is coupled to the diaphragm 110 via a coupling piece 116, can be set with the aid of a second diaphragm 111. This second diaphragm 111 is connected to the outer wall of the second pressure chamber 112 with the aid of a spring 118 and to diaphragm 110 by member 115. The second diaphragm 111 forms a wall of a pressure chamber 121. The pressure in this pressure chamber 121 can be regulated by selectively allowing gas to flow into the pressure chamber 121 via the shut-off valve 126 and the inlet opening 122 or by allowing gas to escape from the pressure chamber 121 via the outlet opening 123 and the shut-off valve 127. The equilibrium position of the member 115 which is attached to the diaphragm 110 is determined as a function of the pressure in the pressure camber 121.

The position depicted in FIG. 10 allows the position of the member 115 with respect to the outlet opening 102, and hence the flow through this outlet opening 102, to be instantaneously regulated. To this end, a pressure gauge 130 is arranged in the feed line 107. This pressure gauge 130 is actively connected to a control unit 131. This control unit 131 in turn controls the shut-off valves 126 and 127.

The devices 20, 60, 100 discussed above are particularly suitable for portable chromatographs. The reason for this is that the devices do not require much power. Power is only required to change the setpoint of the devices, in which event power will be required in order to be able to cause gas to flow into or be discharged from pressure chamber 21. Therefore, there is no need for a constant current in order to keep the diaphragm 10 in position.

A further advantage of the above mentioned device is that the valves in principle are closed. Only when regulating is necessary, i.e. when the pressure in the pressure chamber has to be amended, energy is needed for actuating the valves. That means that the system is able to function with low energy consumption.

A further advantage of the above mentioned device is that the valve in principle are closed. Only when regulating is nessecary, i.e. when the pressure in the pressure chamber has to be amended, energy is needed for actuating the valves. That means that the system is able to function with low-energy consumption.

The device 20, 60, 100 according to the present invention will be suitable for gas streams of from 0.1 ml to 100 ml per minute. The volume of injection gas used may be 20 microlitres per minute.

It will be clear from the above description that the devices 20, 60, 100 according to the present invention operate via a cascade arrangement. The mechanism by which the shut-off valve 15 is mechanically connected to the diaphragm 10 means that adjustment of the opening between the inlet passage 2 and the pressure turbulence chamber 4 will entail an analogue regulation which adjusts itself automatically about an equilibrium value. This equilibrium value itself can be set with the aid of the measuring means 31 which are able to control the shut-off valves 26 and 27.

Normally, the accuracy of a pressure regulator is equal to that of the pressure sensor itself. Due to the analogue regulation of the pressure in the pressure-regulating chamber 4, the device 20. 60, 100 is much more accurate. The resolution which is usual in the prior art is ±1 kPa.

The device 20, 60, 100 makes it possible to achieve a resolution of 1/100 kPa. In the device 20, 60, 100 according to the present invention, the setpoint can be set with a similar degree of accuracy. Owing to the analogue control of the device itself, the. device will be automatically regulated about the setpoint with an accuracy which may reach a level of 1/100 kPa.

This represents an important advantage, particularly for use in gas chromatographs. In use, it is, of course, important that the desired gas flow through the gas chromatograph can be set accurately. However, keeping a gas flow constant once it has been set is even more important for the gas chromatograph to operate successfully. As has been explained above, this high level of accuracy can be achieved using the device 20. 60. 100 according to the invention.

One of the additional advantages of the device 20, 60 according to the present invention is that maintaining a gas pressure on both sides of the diaphragm allows diffusion of the gas through the diaphragm to be limited to a minimum. If the same pressurized gas is maintained on both sides of the diaphragm, there will be no diffusion. Depending on the application, a suitable material for the diaphragm may, for example, be silicone rubber.

In order for the flexible properties of the diaphragm to act appropriately, the diaphragm may be of slightly concave design.

What is claimed is:

1. A pressure regulator device for regulating the pressure of a gas stream, the pressure regulator device comprising:
   a) a housing;
   b) a diaphragm in the housing, the diaphragm having one and another sides;
   c) a pressure regulating chamber in the housing, the pressure regulating chamber comprising a first inlet opening to input the gas stream and a first outlet opening to output a regulated gas stream, wherein at least a part of a wall of the pressure regulating chamber comprises the diaphragm and wherein the diaphragm is operable to completely or partially close one or both of the first inlet and first outlet openings;
   d) a pressure control chamber in the housing to subject the diaphragm, on the side of the diaphragm remote from the pressure regulating chamber, to an adjustable prestressing force, the pressure control chamber having a second inlet opening to input a pressure control gas and a second outlet opening to output the pressure-control gas;
   e) a displaceable closure member in said first inlet or said first outlet opening and, optionally a spring to position the closure member, the closure member being connected to the diaphragm so that the closure member position depends upon the displacement of the diaphragm wherein the closure member can be pulled by the diaphragm toward the control chamber, on the other side of the diaphragm from the closure member, to completely or partially close the respective first inlet or first outlet opening; and
   f) a remotely controllable shutoff valve for the second outlet opening enabling the pressure in the pressure control chamber to be set to a desired pressure to apply the prestressing force to the diaphragm.

2. The device according to claim 1, comprising a flow restriction for the second inlet opening or the second outlet opening or for each of the second inlet opening and the second outlet opening.

3. The device according to claim 1, wherein the side of the diaphragm remote from the pressure regulating chamber adjoins the pressure control chamber.

4. The device according to claim 1, comprising a remotely controllable shutoff valve for the inlet opening of the pressure control chamber.

5. The device according to claim 1, comprising a pressure sensor to sense the pressure of the gas stream in the vicinity of the first outlet opening, the sensed pressure determining the desired pressure set in the pressure control chamber and, optionally, comprising a passage connecting to the first outlet opening wherein the gas stream pressure in the passage is sensed by the pressure sensor.

6. The device according to claim 1, comprising a pressure sensor to sense the pressure of the gas stream in the vicinity of the first inlet opening, the sensed pressure determining the desired pressure set in the pressure control chamber.

7. The device according to claim 1, comprising a remotely controllable shutoff valve for the second inlet opening and a pressure sensor to sense the pressure of the gas stream in the vicinity of the first outlet opening, the sensed pressure determining the desired pressure set in the pressure control chamber.

8. The device according to claim 7, comprising a passage downstream of the first outlet opening, the passage being provided with a gas line connector wherein the pressure sensor is connected to sense the pressure in the passage.

9. The device according to claim 1, comprising a pressure sensor to sense the pressure of the gas stream in the vicinity of the first inlet opening or the first outlet opening, and a control unit actively connected to the pressure sensor and to the remotely controllable shutoff valve of the pressure control chamber, the sensed pressure determining the desired pressure set in the pressure control chamber.

10. The device according to claim 4, comprising a pressure sensor to sense the pressure of the gas stream in the vicinity of the first inlet opening or the first outlet opening, and a control unit actively connected to the pressure sensor and to one or both of the remotely controllable shutoff valves of the pressure control chamber, the sensed pressure determining the desired pressure set in the pressure control chamber.

11. The device according to claim 1, comprising a second pressure control chamber, a second diaphragm adjoining the first pressure control chamber, a coupling member connecting the first diaphragm to the second diaphragm, a feed line to supply the gas stream to the pressure regulating chamber and a flow restriction in the feed line wherein the side of the first diaphragm remote from the pressure regulating chamber adjoins the second pressure control chamber and the second pressure control chamber is in open communication with the feed line.

12. The device according to claim 1, comprising a feed line to supply the gas stream to the pressure regulating chamber wherein the inlet openings of both the pressure control chamber and the pressure regulating chamber are connected to the feed line.

13. The device according to claim 2, wherein both the second inlet opening and the second outlet opening are provided with a flow restriction and each flow restriction comprises a flow-resisting filter member acting to delay gas flow through the respective flow restriction.

14. The device according to claim 1, wherein the closure member is connected centrally of the diaphragm and wherein the closure member is movable along a path extending approximately perpendicularly to the center of the diaphragm, the connection of the closure member to the diaphragm being direct and free of components movable relatively to one another.

15. The device according to claim 1, further comprising:
   g) a remotely controllable shutoff valve for the inlet opening of the pressure control chamber;
   h) a pressure sensor to sense the pressure of the gas stream in the vicinity of the first outlet opening, the sensed pressure determining the desired pressure set in the pressure control chamber;
   i) a flow restriction for each of the second inlet opening and the second outlet opening;
   j) a control unit actively connected to the pressure sensor and to the remotely controllable shutoff valve of the pressure control chamber; and
   k) a feed line to supply the gas stream, the inlet openings of both the pressure control chamber and the pressure regulating chamber being connected to the feed line;
   wherein the closure member is connected to the diaphragm centrally of the diaphragm and wherein the closure member is movable along a path extending approximately perpendicularly to the center of the diaphragm.

16. The device according to claim 15 wherein the control unit has inputs for pressure variation and for the rate of change of pressure variation and wherein the control unit comprises a control algorithm employing fuzzy logic.

17. The device according to claim 1 wherein the device is miniaturized and the diaphragm is fabricated from etched silicon.

18. The device according to claim 1 further comprising a shutoff valve for the pressure control chamber inlet wherein the shutoff valves are formed by flexible closure lips.

19. A gas chromatograph comprising a pressure regulator device according to claim 1.

20. A gas chromatograph comprising a pressure regulator device according to claim 15.

21. A pressure regulator device for regulating the pressure of a gas stream, the pressure regulator device comprising:
   a) a housing;
   b) a diaphragm in the housing, the diaphragm having one and another sides;
   c) a pressure regulating chamber in the housing, the pressure regulating chamber comprising a first inlet opening to input the gas stream and a first outlet opening to ouput a regulated gas stream, wherein at least a part of a wall of the pressure regulating chamber comprises the diaphragm and wherein the diaphragm is operable to completely or partially close one or both of the first inlet and first outlet openings;
   d) a pressure control chamber in the housing to subject the diaphragm, on the side of the diaphragm remote from the pressure regulating chamber, to an adjustable pre-stressing force, the pressure control chamber having a second inlet opening to input a pressure control gas and a second outlet opening to output the pressure-control gas;
   e) a displaceable closure member in said first inlet or said first outlet opening and, optionally a spring to position the closure member, the closure member being connected to the diaphragm so that the closure member position depends upon the displacement of the diaphragm wherein the closure member can completely or partially close the respective first inlet or first outlet opening;
   f) a second pressure control chamber;
   g) a second diaphragm adjoining the first pressure control chamber;
   h) a coupling member connecting the first diaphragm to the second diaphragm;
   i) a feed line to supply the gas stream to the pressure regulating chamber; and
   j) a restriction in the feed line;
   wherein the side of the first diaphragm remote from the pressure regulating chamber adjoins the second pressure control chamber and the second pressure control chamber is in open communication with the feed line.

22. The device according to claim 21, further comprising:
   k) a remotely controllable shutoff valve for the inlet opening of the pressure control chamber;
   l) a pressure sensor to sense the pressure of the gas stream in the vicinity of the first outlet opening, the sensed pressure determining the desired pressure set in the pressure control chamber;
   m) a flow restriction for each of the second inlet opening and the second outlet opening;
   n) a control unit actively connected to the pressure sensor and to the remotely controllable shutoff valve of the pressure control chamber; and
   o) a feed line to supply the gas stream, the inlet openings of both the pressure control chamber and the pressure regulating chamber being connected to the feed line;
   wherein the closure member is connected to the diaphragm centrally of the diaphragm and wherein the closure member is movable along a path extending approximately perpendicularly to the center of the diaphragm.

23. A pressure regulator device for regulating the pressure of a gas stream, the pressure regulator device comprising:
   a) a housing;
   b) a diaphragm in the housing, the diaphragm having one and another sides;
   c) a pressure regulating chamber in the housing, the pressure regulating chamber comprising a first inlet opening to input the gas stream and a first outlet opening to output a regulated gas stream, wherein at least a part of a wall of the pressure regulating chamber comprises the diaphragm and wherein the diaphragm is operable to completely or partially close one or both of the first inlet and first outlet openings;
   d) a pressure control chamber in the housing to subject the diaphragm, on the side of the diaphragm remote from the pressure regulating chamber, to an adjustable pre-stressing force, the pressure control chamber having a second inlet opening to input a pressure control gas and a second outlet opening to output the pressure-control gas; and
   e) a displaceable closure member in said first inlet or said first outlet opening and, optionally a spring to position the closure member, the closure member being connected to the diaphragm so that the closure member position depends upon the displacement of the diaphragm wherein the closure member can completely or partially close the respective first inlet or first outlet opening;

wherein the device is miniaturized and the diaphragm is fabricated from etched silicon.

24. The device according to claim 23 comprising a remotely controllable shutoff valve for the inlet opening of the pressure control chamber wherein the shutoff valves for the inlet and outlet openings of the pressure control chamber each comprise a flexible closure lip.

25. A device according to claim 23, further comprising:
f) a remotely controllable shutoff valve for the second outlet opening enabling the pressure in the pressure control chamber to be set to a desired pressure to apply the prestressing force to the diaphragm;
g) a remotely controllable shutoff valve for the inlet opening of the pressure control chamber;
h) a pressure sensor to sense the pressure of the gas stream in the vicinity of the first outlet opening, the sensed pressure determining the desired pressure set in the pressure control chamber;
i) a flow restriction for each of the second inlet opening and the second outlet opening;
j) a control unit actively connected to the pressure sensor and to the remotely controllable shutoff valve of the pressure control chamber; and
k) a feed line to supply the gas stream, the inlet openings of both the pressure control chamber and the pressure regulating chamber being connected to the feed line wherein the closure member is connected to the diaphragm centrally of the diaphragm and wherein the closure member is movable along a path extending approximately perpendicularly to the center of the diaphragm.

26. A gas pressure regulator for regulating the pressure of a gas in a gas stream, the gas pressure regulator comprising:
a) a flow chamber having a first inlet to input the gas stream and a first outlet to output a pressure regulated gas stream;
b) a closure member movable to completely or partially block the flow of the gas stream through the flow chamber;
c) a diaphragm movable to vary the volume of the flow chamber and connected to the closure member to move the closure member;
d) a pressure control chamber to act on the diaphragm in opposition to the gas stream in the flow chamber to determine the position of the diaphragm, the pressure control chamber having a second inlet being an inlet for a pressure control gas and a second outlet being an outlet for the pressure control gas;
e) a first remotely controllable shutoff valve for the pressure control chamber inlet;
f) a second remotely controllable shutoff valve for the pressure control chamber outlet;
g) a pressure sensor to sense the pressure of the pressure regulated gas stream; and h) a control unit to control the first and second shutoff valves according to the sensed pressure of the pressure regulated gas stream.

27. The device according to claim 26, further comprising:
i) a flow restriction for each of the second inlet and the second outlet; and
k) a feed line to supply the gas stream, the inlet openings of both the pressure control chamber and the pressure regulating chamber being connected to the feed line wherein the closure member is connected to the diaphragm centrally of the diaphragm and wherein the closure member is movable along a path extending approximately perpendicularly to the center of the diaphragm.

28. A method for regulating the pressure of a gas stream comprising:
a) feeding the gas stream to be regulated through an inlet opening to a pressure-regulating chamber, the pressure regulating chamber having a closure member to adjust the size of the inlet opening and control the pressure in the pressure regulating chamber, at least part of the wall of the pressure regulating chamber being formed by a prestressed diaphragm, the closure member being connected to the diaphragm so that a change in the displacement of the diaphragm causes a change in the degree of closure of the inlet opening and the diaphragm being prestressed to cause the closure member to effect closure of the inlet opening;
b) feeding a volume of gas through an inlet to a pressure control chamber through a remotely closable shutoff valve, the pressure control chamber acting on the diaphragm, on the other side of the diaphragm from the pressure regulating chamber, to provide the diaphragm prestressing force; and
c) during or after the feeding of gas to the pressure control chamber, discharging a different volume of gas from the pressure control chamber through a remotely closable shutoff valve to set the gas pressure in the pressure control chamber and determine the prestressing of the diaphragm.

29. The method according to claim 28, further comprising
d) discharging the gas stream from the pressure regulating chamber through an outlet opening;
e) measuring the pressure of the gas stream at least periodically in the vicinity of the outlet opening
c) comparing the measured gas stream pressure with a desired value dependent on a desired starting position of the diaphragm; and
d) feeding or discharging gas to or from the pressure control chamber to increase or reduce the pressure of the pressure control chamber according to the results of the comparison of the measured pressure with the desired value.

30. The method according to claim 29 comprising allowing the pressure in the pressure control chamber to increase or decrease gradually.

31. A method for operating a gas chromatograph comprising regulating a gas flow input to the gas chromatograph by a method according to claim 28.

* * * * *